United States Patent Office 3,227,620
Patented Jan. 4, 1966

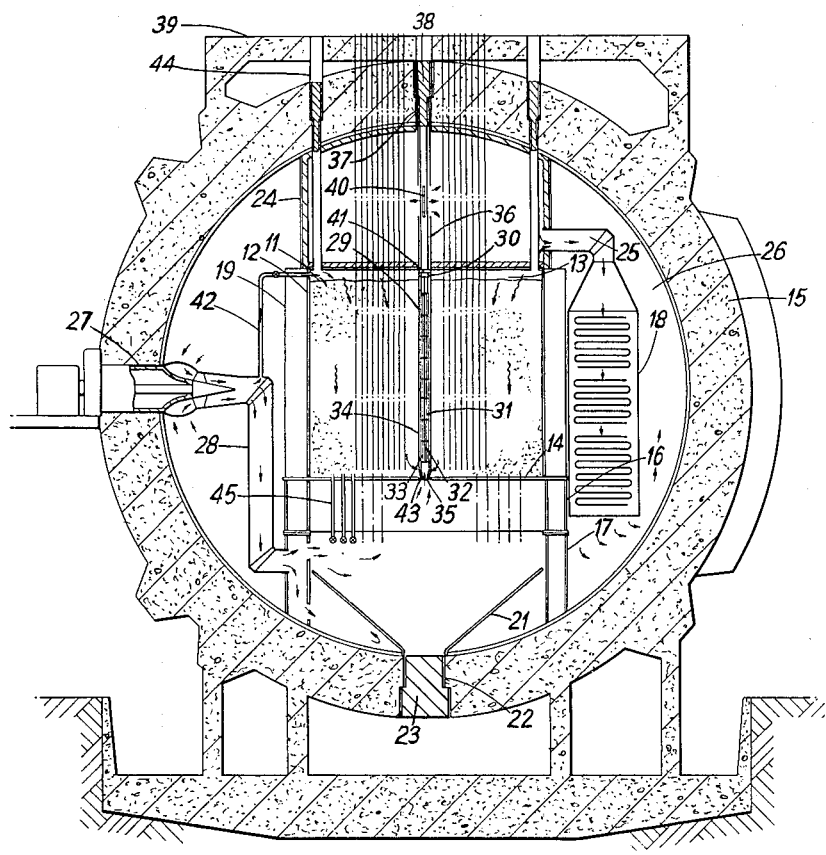

3,227,620
GAS COOLED NUCLEAR REACTOR HAVING REMOVABLE FUEL TUBE ASSEMBLIES DISPOSED IN MASS OF GRANULAR MODERATOR
Burton Cutts, Culcheth, and John Malcolm Hutcheon, Sale, England, assignors to United Kingdom Atomic Energie Authority, London, England
Filed Mar. 14, 1963, Ser. No. 265,117
Claims priority, application Great Britain, Jan. 15, 1963, 1,788/63
8 Claims. (Cl. 176—27)

This invention relates to nuclear reactors.

The invention has as its source the consideration of problems which exist in relation to solid-moderator reactors especially the carbon dioxide cooled graphite moderated reactor.

Problems which can exist singly or in combination are:

(i) Those that follow from irradiation growth, namely physical instability, energy storage and need for mechanical devices to maintain stability.

(ii) Those that follow from reaction between coolant and moderator, namely reduction of strength, loss of moderation and transfer of solids in the reactor coolant circuit.

(iii) Problems of fabrication, namely, the limitation to relatively simple shapes and the limitation to maximum lengths possible without joints.

(iv) The problem of renewal either because of fracture or other damage or because of changed physical or nuclear properties induced by radiation.

Accordingly, the present invention provides a heterogeneous nuclear reactor comprising a core tank, a mass of granular moderator in the core tank, means for renewal of the moderator by granular flow, and a lattice of fuel elements interspersed in the moderator mass, each fuel element comprising a removable assembly of a fuel tube and fuel rods housed in the fuel tube, there being clearance between the fuel rods and the fuel tube for passage of a reactor coolant to abstract heat from the fuel rods.

A reactor having renewable granular moderator is of particular advantage where the reactor is to be moderated by graphite and cooled by gaseous carbon dioxide. It is known that the use of graphite in a nuclear reactor, in the form of bricks and other structural members, is particularly prone to the problem arising from (i) above that stresses are set up in the graphite by the dimensional changes and distortion induced thermally and by neutron irradiation. This problem is removed by the use of granular graphite which relies upon its container to define its shape and can therefore accommodate dimensional changes and distortions in its granules without stressing. Problem (ii) arises with the use of carbon dioxide to cool a graphite moderated reactor and in this case the means for renewing the graphite moderator enables not only partial and complete renewal but also replenishment.

Fixed tubes to define channels for coolant flow and to receive the fuel elements may be arranged in the manner of pressure tubes in a reactor having a calandria vessel, the granular moderator being then packed between them. However, neutron absorbing structure is introduced by metal in those tubes and, furthermore, they could be renewed only with difficulty.

Accordingly in one embodiment of the invention a heterogeneous nuclear reactor having granular moderator and means to renew the moderator by granular flow is provided with fuel assemblies which are interspersed in the moderator and which comprise fuel rods housed in fuel tubes of moderator material which define channels for coolant flow and provide barriers between the fuel rods and the granular moderator. It is preferred that the fuel tubes should be of graphite.

One construction of nuclear reactor embodying the invention will now be described by way of example with reference to the accompanying drawing which shows a diagrammatic sectional view of the reactor.

The illustrated nuclear reactor is moderated by graphite and cooled by pressurised carbon dioxide. The bulk of the moderator is in the form of graphite granules which have an average diameter of between ½ and 1 inch (roughly the size of walnuts). The granules may be approximately spherical but need not be formed with great accuracy to a uniform size or shape. The granules are prepared from purified natural graphite which is powdered and pressed into granular form. In its finished state the material of the granules has a density of over 2 gms. per cc., which is higher than the density (roughly 1.7 gms. per cc.) of artificial graphite having structural properties.

The granular graphite 11 is contained in a closed, cylindrical core tank 12 without completely filling the tank so as to leave an enclosed gas-filled plenum 13 above the graphite. The bottom plate 14 of the tank is carried within a concrete reactor vessel 15 by a diagrid 16 supported by a skirt 17. Twelve heat exchangers 18 (of which one is shown) are mounted within the reactor vessel around the core tank with a cylindrical radiation shield 19 interposed between them and the tank. The heat exchangers provide for heat transfer between the carbon dioxide reactor coolant and a secondary coolant in the form of water (the connections for the secondary coolant are not shown), the radiation shield serves to reduce radiolysis of the water in the heat exchangers. Below the core, a metal tundish 21 converges to an outlet 22 through the reactor vessel which is normally closed by a plug 23. Above the core, a thermally shielded hot box 24 collects hot reactor coolant from the core and discharges this through conduits 25 to the heat exchangers from which the reactor coolant flows into an outer chamber 26 defined within the reactor vessel by the hot box, radiation shield, diagrid and support skirt. Four circulators 27 having impellers within the reactor vessel and driving motors outside the vessel are disposed around the core between the heat exchangers; these circulators draw reactor coolant from the outer portion of the reactor vessel and discharge it through a conduit 28 to the underside of the core tank and also to the underside of the tundish which is thereby cooled.

The core tank is penetrated by upright fuel assemblies 29 which are disposed in a lattice having a pitch which, for present purposes, is 12 inches. These assemblies (only one of which is shown) comprise clustered fuel rods encased in a graphite fuel tube. A central load-bearing stem 31 of stainless steel in each assembly carries spaced support grids 32 along its length and at each end. These grids support and retain bundles of fuel rods 33 clustered around the central stem. The grids also support an open-ended graphite fuel tube 34 which encloses the fuel element from end to end. Each graphite tube is of square section having an internal width of about 6 inches and is made up of elongate graphite strips which are pinned together as the sides of the tube but which are free to expand, under thermal and irradiation stresses, relatively to each other without bowing the tube. The lower end of each fuel assembly is seated on the bottom plate of the reactor tank, there being locating means to position the assembly securely on the bottom plate. An aperture 35 in the plate below each fuel assembly allows reactor coolant to flow from underneath the core tank through the fuel assembly abstracting heat from the fuel rods. At their upper ends the graphite fuel tubes 34 are joined by flexible couplings 30 to stainless steel tubular extensions 36 which extend vertically through the hot box to refuelling channels 37 in the reactor vessel, these extensions having slots 40 for flow of heated reactor coolant into the hot box. The refuelling channels, which are normally closed by shielded plugs 38, are accessible from a refuelling floor 39 above the reactor vessel.

At the lower end of each tubular extension 36 is a grid 41 to which the stainless steel stem 31 of the assembly below is secured. Thus the lifting force to raise a fuel assembly is transmitted from the plug 38 through the tubular extension 36 to the grid 41 and thence through the stem 31 and the grids 32 to the fuel rods and the graphite fuel tube; the graphite fuel tube is not required to transmit this lifting force. Accordingly each fuel assembly has the following components which are raised and lowered as a unitary structure: a graphite fuel tube, a tubular extension, a shield plug, and a cluster of fuel elements, the lifting load from the shield plug being taken by the tubular extension, the stem 31 and the grids 32, 41. Charge and discharge of the assemblies is effected by refuelling machines which grapple the shield plugs in a conventional manner.

In order to remove heat generated in the granular moderator during operation of the reactor it is arranged that a proportion of the reactor coolant (approximately 8 percent) flows through the granules. This flow is downward to avoid any levitation of the granules. The moderator coolant is introduced into the plenum 13 at the top of the core tank through a valved branch pipe 42. Having flowed through the granules this coolant portion bleeds through slit-like apertures 43 in the lower ends of the fuel tubes and joins the main portion of the reactor coolant in the fuel assemblies.

For replenishing the granular graphite in the core tank there are provided moderator tubes 44 which project upwardly from the perimeter of the core tank through the hot box and the reactor vessel and which are accessible from the refuelling floor; the moderator tubes are normally plugged. Valved nozzles 45 are fitted into the bottom plate of the core tank through which high pressure reactor coolant can be injected into the granular moderator in order to fluidise the granules, this technique being used to settle the granules in the tank and thereby achieve maximum packing density.

To charge the reactor, the core is first charged with the fuel assemblies and then the moderator granules are poured into the core tank through the tubes 44. As the vessel is charged the granules are fluidised by means of the nozzles 45 so that the granules flow evenly across the core tank and are packed down in this way to a density approximately 50 to 60% of the density of the solid granular material. Although this implies a reduction in the overall density of the moderator, this disadvantage is offset to some extent by the possibility which the use of granules affords, of using a graphite which is denser than graphite necessary for larger structures. Downward flow of the coolant through the granules ensures that there is no tendency to reduction of moderator density by fluidisation of the granules.

When it is desired to refuel the reactor or a part of the reactor core, the reactor is shut down and the pressure within the reactor vessel is lowered to atmospheric pressure. When one fuel assembly is opened and granular flow of the moderator through the aperture takes place, the granules flow down on to the tundish and are discharged from the reactor vessel on removal of the plug 23. Unless it is desired to refuel the whole core, it is unnecessary to remove all the granular moderator since only that portion which surrounds any particular fuel aperture flows through the aperture in the absence of granular fluidisation. In view of the close spacing of the fuel assemblies remaining in the core tank there is little lateral flow of the granules and a thin conical volume of moderator with its apex at an open aperture is all the moderator that need be removed. It is then possible to lower a fresh fuel assembly into the core tank, if necessary after employing a sweeping implement to clear away any granules obscuring the aperture below the assembly. Finally the moderator is topped up by pouring granules through the moderator tubes 44; these granules may be fresh granules or may be recycled granules discharged during the refuelling operation. The moderator is fluidised while the granules are added so that the granules are compacted once more and spread laterally to fill the voided cavity.

It is to be understood that the invention is not limited to the details of the foregoing example. For instance the moderator granules may be graded in size with the aim of achieving a greater packing density when they are compacted, or the granules may take the form of flat discs or platelets which could achieve greater overall density, especially if advantage is taken of the possibility of making them of natural graphite. Moreover, it would be possible to employ fluidisation of the moderator to facilitate charge and discharge of fuel. Thus in an alternative reactor having fuel assemblies carrying graphite tubes, the tubes are closed at their lower ends and a re-entrant cooling system is provided for each assembly, the coolant being introduced into and withdrawn from the fuel assembly at its upper end. In this alternative reactor the apertures 35 through the bottom plate of the core tank are dispensed with. In charging and discharging this reactor, the moderator granules are first fluidised by means of the nozzles 45 and then the assemblies are raised and lowered in the moderator bed which being fluidised does not offer much resistance to their movement.

The coolant circulation necessary to deal with decay heating of the fuel during charging and discharging may be found more easily obtainable by the alternative in place of the plugged outlet 22 of a pipe leading from this outlet through suitably arranged valves to a vented granule collecting vessel. With the valves open, granules in the tundish would be carried to this vessel by the action of coolant pressure.

What we claim is:

1. A heterogeneous nuclear reactor comprising a core tank, a mass of granular moderator in the core tank, means for renewal of the moderator by granular flow, and a lattice of fuel elements interspersed in the moderator mass, each fuel element comprising a removable assembly of a fuel tube and fuel rods housed in the fuel tube, there being clearance between the fuel rods and the fuel tube for passage of a reactor coolant to abstract heat from the fuel rods.

2. A heterogeneous nuclear reactor as claimed in claim 1 wherein the tubes are constituted of moderator material.

3. A heterogeneous gas-cooled nuclear reactor comprising a core tank, dense graphite granules compacted in the core tank, means to renew the graphite granules by granular flow, and fuel assemblies removably located in the graphite granules, each assembly comprising a bundle of fuel rods and a graphite fuel tube housing the fuel rods to define a channel for coolant flow over the rods and to provide a barrier between the fuel rods and the graphite granules.

4. A heterogeneous gas-cooled nuclear reactor as claimed in claim 3 wherein the means to renew the graphite granules comprises a charge tube communicating with the core tank and means to flow gaseous coolant through the graphite granules in a manner to fluidise the granules.

5. A heterogeneous gas-cooled nuclear reactor comprising a reactor vessel, a core tank within the vessel, a coolant inlet plenum below the core, a coolant outlet plenum above the core, upright fuel assemblies removably located in the core tank each having a graphite fuel tube communicating at its ends with the inlet and outlet plenums respectively and having a bundle of fuel rods housed in the fuel tube, compacted graphite granules filling the core tank between the fuel assemblies to provide a moderator which is renewable by granular flow, a moderator charge tube extending through the reactor vessel and the core tank for introduction of granular graphite into the core tank, and an outlet from the coolant inlet plenum for granular graphite permitted to fall from the core tank on removal of a fuel assembly.

6. A heterogeneous gas-cooled nuclear reactor as claimed in claim 5 wherein the graphite granules are of a spherical shape and are prepared from purified natural graphite powder pressed to an average diameter in the range of ½ inch to 1 inch and a density greater than 2 gms. per cc.

7. A heterogeneous gas-cooled nuclear reactor as claimed in claim 5 wherein each fuel assembly comprises a graphite fuel tube of square section, a central stainless steel stem, spaced support grids carried by the stem whereby the fuel tube is supported from the stem, and a bundle of fuel rods carried within the fuel tube by the support grids.

8. A heterogeneous gas-cooled nuclear reactor as claimed in claim 5 wherein the core tank is filled with graphite granules to a level above which there is a space to be charged with gaseous reactor coolant and wherein the fuel tubes have apertures at their lower ends to provide outlets for coolant passing through the moderator to join reactor coolant flowing through the fuel tubes.

References Cited by the Examiner
UNITED STATES PATENTS

| 3,034,689 | 5/1962 | Stoughton et al. | 176—31 X |
| 3,070,530 | 12/1962 | Metcalf | 60—95 |
| 3,088,904 | 5/1963 | Post | 176—52 |
| 3,100,187 | 8/1963 | Fraas | 176—41 |

FOREIGN PATENTS

| 1,239,599 | 7/1960 | France. |
| 1,265,483 | 5/1961 | France. |

CARL D. QUARFORTH, *Primary Examiner.*

REUBEN EPSTEIN, *Examiner.*